July 31 1951     H. E. NIXON     2,562,363
COMPOUND FLUID MOTOR UNIT

Filed Feb. 5, 1948     2 Sheets-Sheet 1

*INVENTOR.*
HARLEY E. NIXON
BY
*Ralph R. Tweedale*
ATTORNEY

July 31 1951 H. E. NIXON 2,562,363
COMPOUND FLUID MOTOR UNIT
Filed Feb. 5, 1948 2 Sheets-Sheet 2
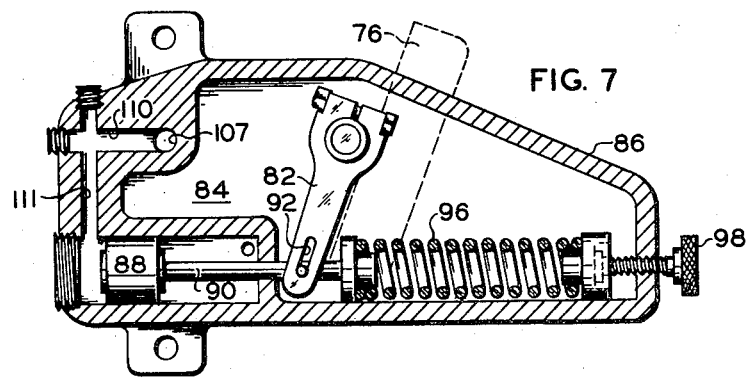
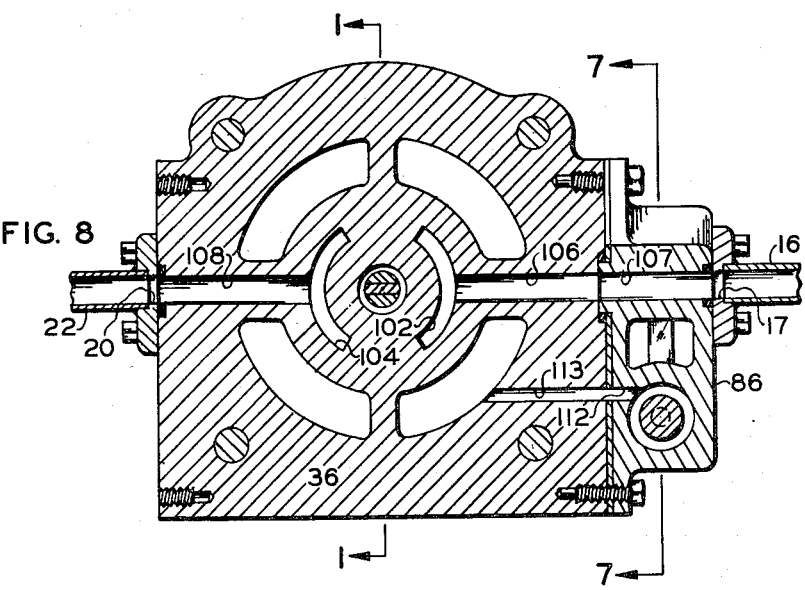
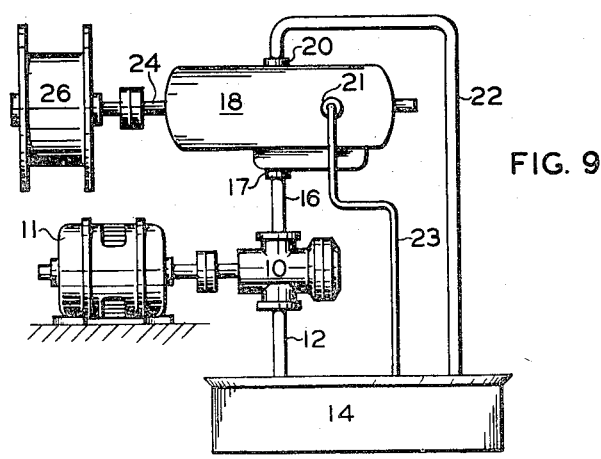
INVENTOR.
HARLEY E. NIXON
BY
ATTORNEY Patented July 31, 1951

2,562,363

UNITED STATES PATENT OFFICE 2,562,363

COMPOUND FLUID MOTOR UNIT

Harley E. Nixon, Detroit, Mich., assignor to Vickers Incorporated, Detroit, Mich., a corporation of Michigan Application February 5, 1948, Serial No. 6,380

3 Claims. (Cl. 60—97)

This invention relates to power transmissions, particularly to those of the type comprising two or more fluid pressure energy translating devices, one of which may function as a pump and another as a fluid motor.

The invention is generally concerned with variable speed and torque hydraulic power transmission and is particularly concerned with a hydraulic motor unit having a wide range of speeds and torques for use in transmissions of this type.

In designing transmissions of this type, where a wide range of speeds and torques is demanded, the problem is presented of economically and efficiently satisfying the requirements of the high torque and low speed demanded at one end of the range and at the same time also satisfying the requirements of the low torque and high speed demanded at the extreme opposite end of the range.

For example, the high torque low speed requirement at one end of the range may require a hydraulic motor of a very large size. At the same time the high speed and low torque requirements at the opposite end of the speed torque range may be satisfactorily met by a small high speed motor. Whereas low speed motors are efficient at high torque operation, a much smaller and more economical high speed unit may be employed for low torque operation.

The single variable displacement motor has a limited efficient range. Due to the fact that the standard variable speed and torque hydraulic power transmission is unsuitable for meeting the requirements of installations demanding a very wide range of speeds and torques, attempts were made to meet the problem by employing a plurality of smaller and more economical fluid energy translating devices with intricate valving for connecting the same in series and in parallel circuits.

It is an object of this invention to provide a wide range variable speed and torque multiple motor unit.

It is also an object of this invention to provide a wide range variable speed and torque multiple motor unit which employs a minimum of fluid energy translating devices without the aid of intricate valving.

It is still another object of this invention to provide a wide range variable speed and torque multiple motor unit which may employ standard well known fluid energy translating devices and which will provide economical and efficient operation.

Further objects and advantages of the present invention will be apparent from the following description, reference being had to the accompanying drawings wherein a preferred form of the present invention is clearly shown.

In the drawings:

Figure 7 is a sectional view of a pressure regulating mechanism taken on line 7—7 of Figure 8.

Figure 8 is a sectional view taken on line 8—8 of Figure 1.

Figure 9 is a diagrammatic view of a hydraulic transmission system embodying a preferred form of the present invention.

Figure 1:
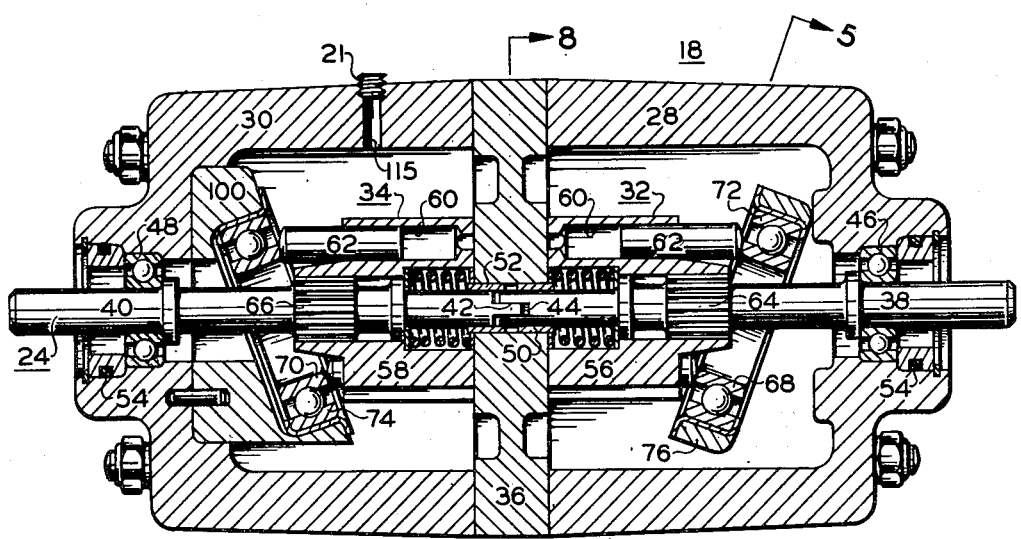
Figure 1 is a longitudinal sectional view of a multiple motor unit incorporated in the hydraulic circuit shown in Figure 9, the section being taken on line 1—1 of Figure 8.

Referring now to Figure 9 there is shown a diagrammatic view of a hydraulic power transmission system comprising a fixed displacement fluid pump 10 which may be driven at a constant speed by an electric motor 11. The pump 10 is connected by a suction conduit 12 to a tank 14 and by a delivery conduit 16 to an inlet port 17 of a multiple motor unit 18. The motor unit 18 is also provided with an outlet port 20 and a drain port 21 which are respectively connected to the tank 14 by conduits 22 and 23. An output shaft 24 of the motor unit 18 is connected to a load device such as a reel and indicated by the numeral 26.

Referring now to Figure 1, the housing of the motor unit 18 is comprised of two sections 28 and 30 within which are respectively mounted two fluid motors of the axial piston type 32 and 34, the latter of which is of the fixed displacement type and the former of which is of the reversible variable displacement type. The housing sections 28 and 30 are suitably bolted with their open ends in abutment against a stationary valve plate member 36.

The output shaft 24 is preferably comprised of two sections 38 and 40 which are adapted to rotate in unison by a tongue and groove connection indicated respectively by the numerals 42 and 44. The shaft sections 38 and 40 are journalled on bearings 46 and 48 in the housing sections 28 and 30 and on needle bearings 50 and 52 in the valve plate member 36. Suitable oil seals 54 are provided where the shaft sections extend through their respective housing sections.

The motors 32 and 34 are comprised of cylinder barrels 56 and 58 of duplicate construction, each of which is provided with a plurality of axial cylinders 60 within which pistons 62 are slidably mounted. The cylinder barrels 56 and 58 are in driving engagement with their respective shaft sections 38 and 40 of the output shaft 24 by means of splined sections indicated by the numerals 64 and 66. The pistons 62 have spherical rear ends abutting against inner races 68 and 70 of thrust bearing plates 72 and 74.

The bearing plate 72 of the variable motor section is mounted in a tilting box 76 which is carried on trunnions 78 and 80 (Figure 5) mounted in the housing section 28. The trunnion 80 is rigidly secured to the tilting box for the purpose of changing its angular position while the trunnion 78 is rigidly secured to the housing section 28 to provide a stationary pivot on which the tilting box 76 may oscillate. The tilting box 76 is provided with an arm 81 (Figure 4) to which the trunnion 80 is connected. The trunnion 80 extends from the arm 81 through the housing section 28 and is connected to a lever arm 82 (Figure 7).

Referring now to Figure 7, the lever arm 82 is controlled by a constant pressure regulator and control mechanism indicated generally by the numeral 84 which is mounted in a pressure control box 86. The regulator mechanism 84 is comprised of a piston 88 connected to which is a piston rod 90, the latter of which is connected to a slot section 92 of the lever arm 82. The piston 88 is biased to one end of its stroke by a spring 96 of predetermined resistance which may be adjusted by means of a screw 98. The thrust bearing plate 74 of the fixed displacement motor section is mounted in a stationary angle box 100 rigidly secured to the housing section 30 (Figure 1).

Referring now to Figure 8, the valve plate member 36 is provided with arcuate inlet and outlet ports 102 and 104 extending from opposite faces of and completely through the valve plate member. The valve plate inlet port 102 is connected to the externally located inlet connection port 17 by a valve plate passage 106 and a passage 107 in the control box 86. The valve plate outlet port 104 is connected to the external outlet connection port 20 by a passage 108. The inlet passage 107 is also connected by passages 110 and 111 to the piston end of the pressure control regulator 84. The rod end of the regulator 84 is connected to the interior of the housing sections by a passage 112 in the control box 86 and a passage 113 in the valve plate 36 (Figure 7). The interior of the housing sections is connected to the drain port 21 by a passage 115 in the housing section 30 (Figure 1).

Figures 5, 6:
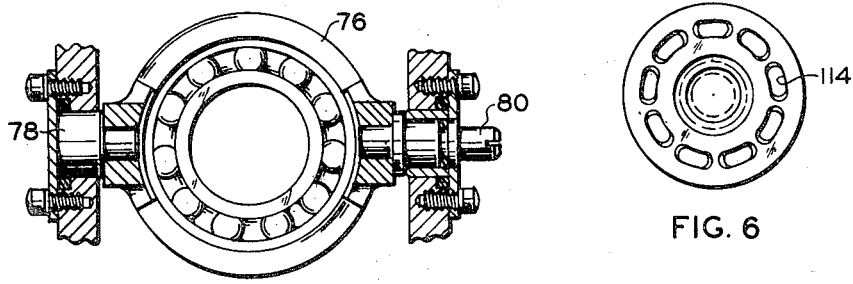
Figure 5 is a view taken on line 5—5 of Figure 1.
Figure 6 is an end view of the cylinder barrels incorporated in the multiple motor unit.

Referring to Figure 6, the cylinders 60 of cylinder barrels 56 and 58 are each provided with ports 114 which are adapted to alternately register with the inlet and outlet ports of the valve plate member 36 as the cylinder barrels rotate against the valve plate member 36.

In operation, with the pump 10 being driven at a constant speed by the electric motor 11, a constant fixed fluid displacement from the pump 10 will be delivered by means of conduit 16 to the inlet port 17 of the multiple motor unit 18. With the tilting box 76 of the motor 32 in the position shown in Figure 1, the multiple motor unit 18 is in maximum torque low speed position. The angle of the thrust bearing plate 74 remains fixed so that the pistons 62 of motor 34 will always have a fixed maximum stroke. Consequently, the displacement per revolution of the motor 34 remains fixed.

The angle of the tilting box 76 is also at maximum so that the pistons 62 of the motor 32 will also have a maximum stroke and consequently a maximum displacement. As the pump displacement must be divided equally between the motors 32 and 34, the speed of the output shaft 24 will be slow while the torque transmitted to the shaft 24 will be the combined maximum torque of the motors 32 and 34. Pressure fluid from the pump 10 is delivered to the inlet side of both motors by means of the delivery conduit 16, inlet connection port 17, passages 107 and 106 and the arcuate valve plate inlet port 102. The displacement from both motors is delivered to the tank 14 by the valve plate outlet port 104, passage 108, outlet connection port 20, and the conduit 22.

Figures 2, 3, 4:
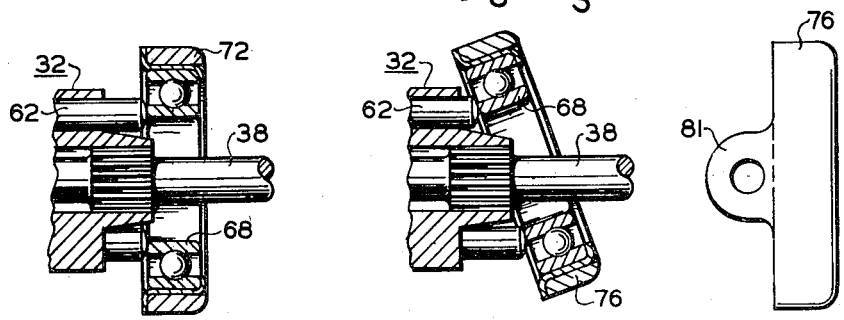
Figures 2 and 3 are partial sectional views of a portion of the unit shown in Figure 1 illustrating the different positions of the mechanism during operation.
Figure 4 is a side view of the tilting box incorporated in the multiple motor unit.

Assuming that material is being unwound from the reel 26, at the start of the unwinding operation the torque requirement is high while the speed requirement is low. Thus, with the angle of the tilting box 76, as shown in Figure 1, the starting requirements of speed and torque will be satisfied by the multiple motor unit 18. As the material continues to be unwound from the reel, the torque requirement gradually decreases while the speed must be increased in inverse proportion. The pressure control regulator 84 is adapted, not matter what the variance in load, to maintain the pressure in the system at a substantially constant pressure. Pressure fluid entering the inlet connection port 17 is delivered to the piston end of the regulator 84 by means of the passages 107, 110, and 111. The angle of the tilting box 76 will be gradually shifted by the pressure control regulator 84 toward the neutral position, shown in Figure 2, for shortening the stroke of the pistons of motor 32, and consequently the displacement thereof. The total displacement of both motors thus becomes less per revolution, and as the same amount of fluid is continued to be supplied from the pump 10, it will take more revolutions per minute of the cylinder barrels 56 and 58 to consume this fluid. Consequently, the speed of the output shaft will be increased and the torque delivery inversely decreased. When the angle of the tilting box 76 reaches the neutral position, as shown in Figure 2, the motor 34 will receive the total fluid displacement from the pump 10, and the torque transmitted to the output shaft for driving the load device will be solely that transmitted by the motor 34. The cylinder barrel 56, being connected to the output shaft 24, continues to rotate, but the pistons therein do not reciprocate. From the neutral position shown in Figure 2, the tilting box 76 will continue to be shifted to the opposite side of neutral until it reaches the position shown in Figure 3.

It should be noted that the motors 32 and 34 are not only mechanically coupled to the same output shaft, but are also hydraulically connected to each other. The inlet and outlet connections 17 and 20 are respectively connected to the inlet and outlet sides of both motors by means of the inlet passages 106 and 107 and the outlet passage 108 and the arcuate inlet and outlet ports 102 and 104 of the valve plate member 36. From the maximum angle position of the tilting box 76 (Figure 1) to the neutral position of said box (Figure 2), the motor 32 is driven as a motor. However, when the tilting box 76 is shifted to the opposite side of neutral, the function of the inlet and outlet arcuate ports 102 and 104, insofar as they pertain to the operation of motor 32, become reversed. That is, the pump flow tends to drive the motor 32 in the opposite direction of rotation than that of motor 34.

Due to the fact that the angle of the box 100 is much greater than that of the tilting box 76 when the latter has been shifted slightly past the neutral position, the torque delivery output of the motor 34 is much greater than that capable of being delivered by the motor 32 so that the tendency of motor 32 to drive the shaft 24 in the opposite direction is overcome, and the motor 34 will drive the motor 32 as a pump. Consequently, the inlet side of the motor pump unit 32 is now connected to the tank 14 and to the outlet side of the motor 34 while the outlet side of the motor 32 is directly connected to the inlet side of the motor 34.

The complete displacement of the pump 10 is still delivered to the inlet port 17 of the multiple motor unit 18 and by means of the inlet passages 107 and 106 delivered to the arcuate inlet port 102 of the valve plate 36. However, all of this fluid displacement is utilized by the motor 34. The outlet port 104 of the valve plate 36 now functions as an inlet port for the motor 32 now being driven as a pump. Consequently, the inlet side of the motor pump unit 32 is connected to the tank 14 and to the outlet port 104 of the motor 34. The inlet port 102 now functions as an outlet port for the motor pump unit 32 and this port is directly connected to the inlet side of the motor unit 34. The complete displacement of the unit 32 is added to the displacement of the pump 10 delivered to the inlet side of the motor unit 34. The stroke of the motor pump unit 32 is small so that its displacement is small, but as the tilting box 76 is shifted more and more towards the maximum angle shown in Figure 3, the displacement will gradually increase. This gradually increased displacement is added to the pump displacement so as to gradually drive the motor 34 at an increased speed up to maximum. The torque transmitted to the output shaft 24 is that delivered solely by the motor 34 minus the torque necessary to drive the motor 32 as a pump. The torque transmitted by the motor 34 will gradually decrease inversely to its increase of speed, and in addition, the torque delivery is further decreased by the increasing amount of torque necessary to drive motor 32 as a pump.

In summary, it may be said that when driven as a motor, the displacement of motor 32 is subtracted from the displacement of the pump 10 delivered to the motor unit 18. The torque transmitted by the motor 32 is added to the torque transmitted by motor 34. As the angle of the tilting box 76 is moved toward the neutral position, the amount of fluid subtracted becomes less so as to increase the speed of the output shaft 24 and the combined torque transmitted is decreased in inverse proportion.

When the tilting box 76 reaches a neutral position, the full displacement of the pump 10 is used to drive the motor 34 and the speed and torque of the output shaft is that delivered solely by the motor 34. When the tilting box 76 is shifted to the opposite side of neutral, the motor 32 is driven as a pump by the motor 34. The displacement from the motor pump unit 32 is gradually increased and is added to the full displacement of the pump 10 delivered to the motor 34 so as to increase its speed. However, as the displacement of the motor pump unit 32 increases, the torque necessary to drive the same as a pump increases, and this torque increase is subtracted from the torque transmitted by the motor 34 to the output shaft, decreasing the same.

It should thus be noted that the range of speed and torque provided by the arrangement disclosed and explained is much wider than that transmitted by the standard transmission of one fixed and one variable displacement unit. The size of the units necessary to transmit the high torque necessary for high torque operation is decreased, and in addition the wide range of speed and torque is provided by the use of a minimum of smaller units without the use of intricate valving.

While the form of embodiment of the invention as herein disclosed constitutes a preferred form, it is to be understood that other forms might be adopted, all coming within the scope of the claims which follow.

What is claimed is as follows:

1. A variable speed and torque hydraulic motor comprising an output shaft, a fixed displacement fluid motor unit mechanically coupled to the shaft, a multiple piston type variable stroke, reversible displacement, fluid motor unit also mechanically coupled to the shaft and hydraulically connected in parallel to the first unit, a common inlet and a common outlet for said units, and control means for the second unit to vary its piston stroke from full displacement in one direction to substantially full displacement in the other direction, to cause the variable unit to either aid or oppose the fixed unit and thereby extend the operating speed range beyond the range obtainable with a single variable displacement motor.

2. A variable speed and torque hydraulic motor comprising an output shaft, a fixed displacement fluid motor unit mechanically coupled to the shaft, a multiple piston type variable stroke, reversible displacement, fluid motor unit also mechanically coupled to the shaft and hydraulically connected in parallel to the first unit, said units being of the same maximum displacement, a common inlet and a common outlet for said units, and control means for the second unit to vary its piston stroke from full displacement in one direction to substantially full displacement in the other direction, to cause the variable unit to either aid or oppose the fixed unit and thereby extend the operating speed range beyond the range obtainable with a single variable displacement motor.

3. A variable speed and torque hydraulic motor comprising an output shaft, a fixed displacement fluid motor unit mechanically coupled to the shaft, a multiple piston type variable stroke, reversible displacement, fluid motor unit also mechanically coupled to the shaft and hydraulically connected in parallel to the first unit, a common inlet and a common outlet for said units, and control means for the second unit to vary its piston stroke from full displacement in one direction to substantially full displacement in the other direction, to cause the variable unit to either aid or oppose the fixed unit and thereby extend the operating speed range beyond the range obtainable with a single variable displacement motor, said control means comprising a pressure responsive control motor connected to the inlet and arranged to hold the second unit in full stroke aiding position when the inlet is low and upon increase in inlet pressure to reduce the stroke to zero and upon further pressure increase to increase the stroke in the opposing direction.

HARLEY E. NIXON.

REFERENCES CITED

The following references are of record in the file of this patent:

UNITED STATES PATENTS

| Number | Name | Date |
|---|---|---|
| 1,669,976 | De Leeuw | May 15, 1928 |
| 2,453,128 | Hautzenroeder | Nov. 9, 1948 |

FOREIGN PATENTS

| Number | Country | Date |
|---|---|---|
| 3,827 | Great Britain | Feb. 13, 1914 |